(12) United States Patent
Su et al.

(10) Patent No.: US 10,154,461 B2
(45) Date of Patent: Dec. 11, 2018

(54) WIRELESS NETWORKING-ENABLED PERSONAL IDENTIFICATION SYSTEM

(71) Applicant: QUALCOMM Incorporated, San Diego, CA (US)

(72) Inventors: David Kuochieh Su, Saratoga, CA (US); Ning Zhang, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/296,905

(22) Filed: Oct. 18, 2016

(65) Prior Publication Data

US 2017/0041879 A1  Feb. 9, 2017

Related U.S. Application Data

(62) Division of application No. 14/040,213, filed on Sep. 27, 2013, now Pat. No. 9,510,193.
(Continued)

(51) Int. Cl.
*G06F 21/32* (2013.01)
*G06F 21/44* (2013.01)
(Continued)

(52) U.S. Cl.
CPC ........ *H04W 52/0264* (2013.01); *G06F 21/32* (2013.01); *G06F 21/44* (2013.01);
(Continued)

(58) Field of Classification Search
CPC ... H04W 52/0264; H04W 12/06; G06F 21/32; G06F 21/44; H04L 63/0876
See application file for complete search history.

(56) References Cited

U.S. PATENT DOCUMENTS

| 7,549,576 B2 | 6/2009 | Alderucci et al. |
| 8,427,278 B2 | 4/2013 | Petricoin, Jr. |

(Continued)

FOREIGN PATENT DOCUMENTS

| CN | 101023651 | 8/2007 |
| CN | 102906360 | 1/2013 |

(Continued)

OTHER PUBLICATIONS

"European Patent Office Application No. 14720832.6 Supplementary Partial European Search Report", Dec. 21, 2016, 12 pages.
(Continued)

*Primary Examiner* — Qun Shen
(74) *Attorney, Agent, or Firm* — Qualcomm Inc (DL)

(57) ABSTRACT

A personal identification device may conserve power by delegating one or more operations to another device. For example, the one or more operations may be associated with the authentication of the personal identification device. In one example, the personal identification device may determine an amount of power greater than a power threshold will be consumed by the personal identification device to perform the one or more operations. The personal identification device may determine it can communicate with a mobile device that is capable of performing the one or more operations, and may then delegate the one or more operations to the mobile device to conserve power. In one example, the personal identification device may receive the results of the one or more operations from the mobile device, and may provide data associated with the results to a personal identification device detector for authentication of the personal identification device.

12 Claims, 5 Drawing Sheets

Related U.S. Application Data

(60) Provisional application No. 61/800,518, filed on Mar. 15, 2013.

(51) Int. Cl.
   *H04W 52/02* (2009.01)
   *H04W 12/06* (2009.01)
   *H04L 29/06* (2006.01)

(52) U.S. Cl.
   CPC ......... *H04L 63/0876* (2013.01); *H04W 12/06* (2013.01); *H04L 63/0861* (2013.01); *Y02D 70/00* (2018.01); *Y02D 70/166* (2018.01); *Y02D 70/26* (2018.01)

(56) References Cited

U.S. PATENT DOCUMENTS

| | | | |
|---|---|---|---|
| 9,417,907 B1* | 8/2016 | Dire | G06F 9/4843 |
| 2004/0073801 A1* | 4/2004 | Kalogridis | G06F 21/305 |
| | | | 713/176 |
| 2004/0203708 A1* | 10/2004 | Khan | H04L 29/06027 |
| | | | 455/422.1 |
| 2005/0130634 A1 | 6/2005 | Godfrey | |
| 2005/0261037 A1* | 11/2005 | Raghunath | H04W 52/0229 |
| | | | 455/574 |
| 2006/0016877 A1 | 1/2006 | Bonalle et al. | |
| 2006/0036855 A1 | 2/2006 | Simonen | |
| 2007/0072474 A1 | 3/2007 | Beasley et al. | |
| 2007/0186105 A1 | 8/2007 | Bailey et al. | |
| 2007/0207750 A1* | 9/2007 | Brown | H04W 52/0216 |
| | | | 455/127.5 |
| 2007/0245152 A1 | 10/2007 | Pizano et al. | |
| 2008/0041937 A1 | 2/2008 | Vawter | |
| 2008/0268828 A1* | 10/2008 | Nagaraja | G06F 9/505 |
| | | | 455/419 |
| 2010/0064154 A1* | 3/2010 | King | H04W 52/0251 |
| | | | 713/320 |
| 2010/0283682 A1 | 11/2010 | Heidari-Bateni et al. | |
| 2011/0055891 A1 | 3/2011 | Rice | |
| 2011/0109431 A1 | 5/2011 | Bragagnini et al. | |
| 2011/0161696 A1 | 6/2011 | Fletcher | |
| 2011/0202466 A1 | 8/2011 | Carter | |
| 2011/0237224 A1 | 9/2011 | Coppinger | |
| 2012/0169463 A1 | 7/2012 | Shin et al. | |
| 2012/0176976 A1 | 7/2012 | Wells | |
| 2012/0216044 A1 | 8/2012 | Chung et al. | |
| 2012/0240195 A1 | 9/2012 | Weiss | |
| 2012/0284517 A1 | 11/2012 | Lambert | |
| 2013/0106581 A1* | 5/2013 | Hinsey | H04L 63/0853 |
| | | | 340/10.1 |
| 2013/0143595 A1 | 6/2013 | Moshfeghi | |
| 2013/0347073 A1* | 12/2013 | Bryksa | H04L 63/105 |
| | | | 726/4 |
| 2014/0095601 A1* | 4/2014 | Abuelsaad | G06F 9/5072 |
| | | | 709/204 |
| 2014/0101453 A1 | 4/2014 | Senthurpandi | |
| 2014/0273963 A1 | 9/2014 | Su et al. | |

FOREIGN PATENT DOCUMENTS

| | | |
|---|---|---|
| EP | 1411430 | 4/2004 |
| GB | 2453383 | 4/2009 |
| WO | 2014144563 | 9/2014 |

OTHER PUBLICATIONS

"PCT Application No. PCT/US2014/029027 International Preliminary Report on Patentability", dated Jun. 12, 2015, 8 pages.
"PCT Application No. PCT/US2014/029027 International Search Report", dated Jan. 27, 2015, 17 pages.
"U.S. Appl. No. 14/040,213 Final Office Action", dated Feb. 2, 2016, 21 pages.
"U.S. Appl. No. 14/040,213 Office Action", dated Jul. 16, 2015, 20 pages.
Supplementary European Search Report—EP14720832—Search Authority—Munich—dated Sep. 16, 2016, 6 pages.
Co-Pending U.S. Appl. No. 14/040,213, filed Sep. 27, 2013, 49 pages.
"European Search Report—EP17204836—Search Authority—Munich", dated Jan. 31, 2018, 8 pages.

* cited by examiner

WIRELESS NETWORKING-ENABLED PERSONAL IDENTIFICATION SYSTEM

RELATED APPLICATIONS

This application is a divisional of U.S. application Ser. No. 14/040,213 filed on Sep. 27, 2013, which claims priority to U.S. Provisional Application Ser. No. 61/800,518 filed on Mar. 15, 2013.

BACKGROUND

Embodiments of the inventive subject matter generally relate to the field of wireless devices, and, more particularly, to wireless networking-enabled personal identification devices.

Perhaps the most common authentication technique used in the digital world is the combination of a username and a password. A username identifies the user, while the password is, at least optimally, known only to that user. The system assumes, based on the knowledge of the password, that the user is who they claim to be. Other forms of authentication are also used, such as biometric authentication, in which unique physical aspects of a user are used to confirm the user's identity, or communicating with a radio frequency (RF) chip embedded in a keycard. Furthermore, various authentication techniques can be combined to create multi-factor authentication.

Wireless communications permit wireless authentication methods, such as communications using the aforementioned embedded RF chip. RF chips and circuits are also present in some identification tags for toll roads and credit cards, among others. Other technology, such as the near field communication (NFC) standards allow communication and authentication between electronic devices. The number of available authentication techniques and technologies highlights the challenges associated with determining whether a person is who they claim to be in a digital world.

SUMMARY

Various embodiments for a wireless networking-enabled personal identification system are disclosed. In one embodiment, a beacon message is wirelessly transmitted from a first device. A first response to the beacon message is received at the first device. The first response includes identification values associated with a personal identification device. A second device associated with the personal identification device is communicated with. The personal identification device is authenticated based, at least in part, on the identification values and the communication with the second device.

In one embodiment, it is determined that a personal identification device can communicate with a first device. It is determined that a set of one or more operations performable by the personal identification device may consume an amount of power greater than a power threshold. The set of one or more operations is delegated to the first device. The delegation is based, at least in part, on the determination that the personal identification device can communicate with the first device and determining that the set of one or more operations performable by the personal identification device may consume an amount of power greater than the power threshold.

In one embodiment, a personal identification device comprises a processor and a personal identification device control unit. The personal identification device control unit is configured to determine that the personal identification device can communicate with a first device. The personal identification control unit is further configured to determine that a set of one or more operations performable by the personal identification device may consume an amount of power greater than a power threshold. The personal identification device control unit is further configured to delegate the set of one or more operations to the first device. The delegation is based, at least in part, on the determination that the personal identification device can communicate with the first device and the determination that the set of one or more operations performable by the personal identification device may consume an amount of power greater than the power threshold.

In one embodiment, a system comprises a personal identification device and a personal identification device detector. The personal identification device is associated with a user and is configured to respond to authentication queries. The personal identification device detector is configured to detect the personal identification device and authenticate the personal identification device based, at least in part, on communicating with a second personal identification device. The second personal identification device is associated with the user.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
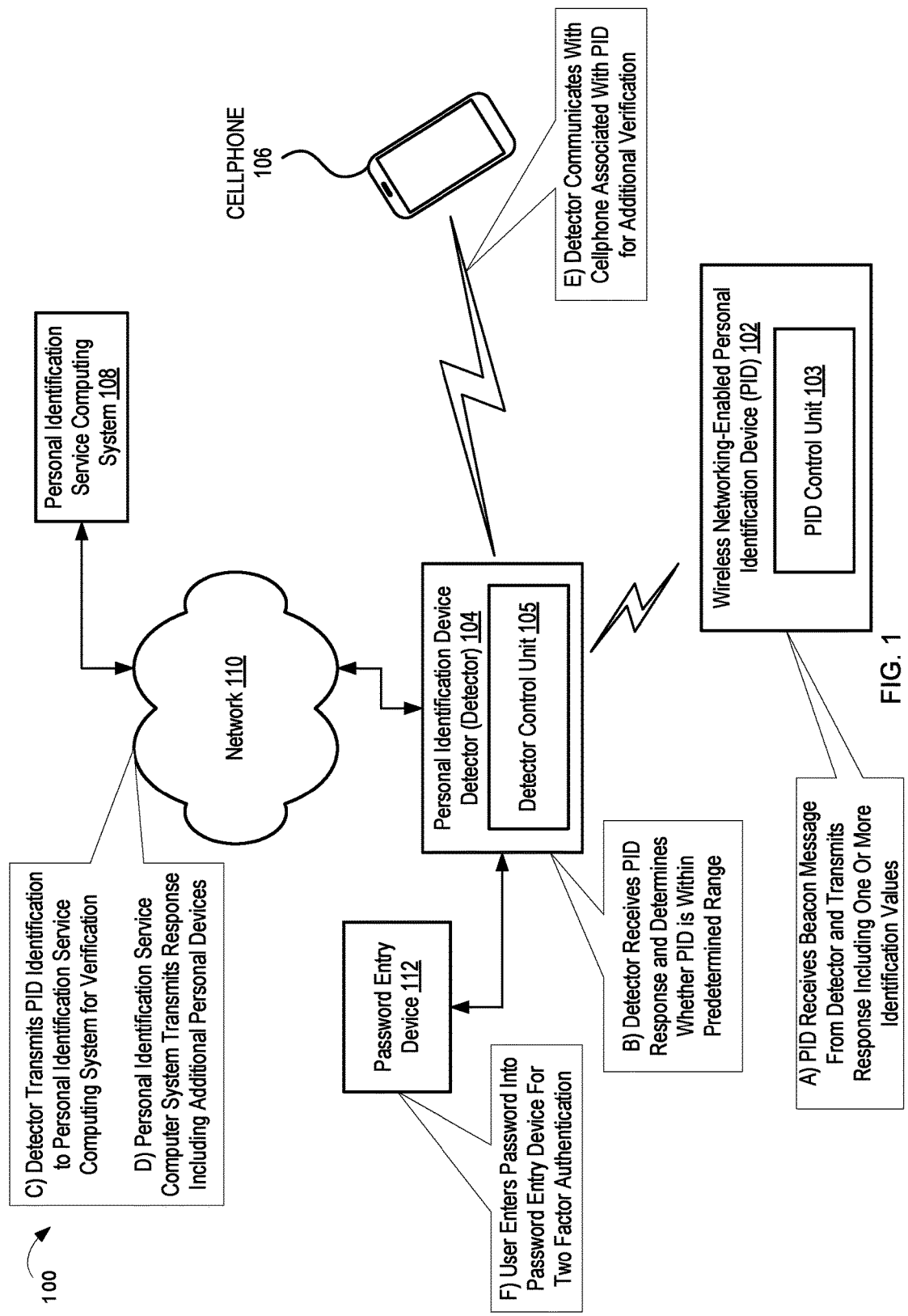
FIG. 1 is an example diagram depicting the interactions of a system that utilizes a personal identification device.

The description that follows includes example systems, methods, techniques, instruction sequences and computer program products that embody techniques of the present inventive subject matter. However, it is understood that the described embodiments may be practiced without these specific details. For instance, although examples refer to password and biometric authentication techniques, any authentication technique can be combined with the inventive subject matter. In other instances, well-known instruction instances, protocols, structures and techniques have not been shown in detail in order not to obfuscate the description.

Authentication techniques do not prove, to an absolute certainty, that an authenticating person is who they claim to be. For example, even if a password is not known to anyone but the legitimate user, a malicious user can use a computer to perform a brute force attack by trying random combinations of characters until the correct password is found. Biometric data, such as fingerprints and even genetic material rely on processes that could, theoretically, result in two people having the same biometric data. Thus, the goal of authentication is not to prove that the authenticating person is who they claim to be, but rather that they are who they claim to be to an acceptable probability. An "acceptable probability" can be defined based on the sensitivity of what is being protected or the repercussions of a breach. For example, logging into a computing system that is restricted to personal files may only require a password, but logging into a computing system with highly sensitive data may require not only a password, but also authentication, such as a fingerprint scan, to get access to the computing system and a regularly changing passcode based on cryptographic principles. By using authentication methods that result in an increased probability that the user is who they claim to be, security is increased.

However, more secure authentication techniques tend to be more cumbersome. Even passwords, alone, are fairly cumbersome and generally not regarded as very secure, at least in practice. For example, for optimal security, passwords should be random and should not be used for multiple logins. However, users tend to take shortcuts with passwords (e.g., dictionary based passwords used for an extended period of time), reducing their effectiveness. Two factor authentication, such as entering an additional, random passcode in addition to a password can provide added security, but increases the complexity of authentication for the user. However, integrating wireless networking capabilities with a personal identification device, such as a dongle or key fob, can reduce the complexity associated with authentication, while also increasing the level of security offered.

Thus, a system can be implemented to use a wireless networking-enabled personal identification device (hereinafter "personal identification device" or PID) alone or in combination with other personal devices to securely authenticate a user. Cryptographic techniques can be used to securely authenticate the personal identification device. The security of the authentication can be further improved by combining the authentication using the personal identification device with authentication using additional personal devices, such as a cell phone or credit card with an embedded RF chip. Determination of the distance between the personal identification device and an additional personal device, referred to as "ranging," can also be used to improve the security of the authentication, while also being used to identify personal identification devices of interest. Further, communication with a third party computing system can facilitate and streamline the use of the personal identification device. Additional techniques, such as offloading of computational tasks, can be employed to lower power consumption of the personal identification device.

FIG. 1 is an example diagram depicting the interactions of a system that utilizes a personal identification device. FIG. 1 depicts a set of authentication-related components 100, including a personal identification device 102, a personal identification device detector (hereinafter "detector") 104 and a cellphone 106. A personal identification service computing system (hereinafter "computing system") 108 is connected to the detector 104 by a network 110. The network 110 can be a combination of multiple networks, including a local area network, wide area network, the Internet, etc. A password entry device 112 is connected to the detector 104. The personal identification device 102 and cellphone 106 are depicted as being wirelessly connected to the detector 104. However, the personal identification device 102 and the cellphone 106 can be connected via hardware, for example by wires. Additionally, the personal identification device 102 and the cellphone 106 can connect to the detector 104 through the network 110. The personal identification device 102 includes a personal identification device control unit 103 that implements some or all of the functionality of the personal identification device 102 described herein. The detector 104 includes a detector control unit 105 that implements some or all of the functionality of the detector 104 described herein.

At stage A, the personal identification device 102 receives a beacon message from the detector 104 and transmits a response including one or more identification values. The message received by the personal identification device 102 can be a beacon message, which is a broadcast message indicating to any device within range that the detector 104 is available. The beacon message can indicate the type of communication protocols compatible with the detector 104, as well as other metadata such as protocol version number, options supported, etc. While "beacon message" will be used hereinafter to describe the initial message sent by the detector 104 to differentiate the initial message from additional messages that may be transmitted, embodiments are not so limited.

Upon receiving the beacon message from the detector 104, the personal identification device 102 generates and transmits a response to the detector 104. The personal identification device 102 response can include two identification values: an unencrypted identification value and an encrypted identification value. The identification values are used to authenticate the personal identification device 102, as described below. The personal identification device 102 response can also include other data as defined by the particular implementation. The personal identification device 102 can be implemented to maintain a low power state until receiving a beacon message from a detector to preserve battery life.

In some implementations, the beacon message is relayed by another device, such as the cellphone 106. For example, the detector 104 can transmit an initial beacon message, which is received by the cellphone 106. The cellphone 106 can then transmit the same beacon message, or a modified beacon message. For example, the cellphone 106 might modify the beacon message to indicate that any response be transmitted to the cellphone 106 instead of the detector 104. The personal identification device 102 can then transmit the response to the cellphone 106 instead of the detector 104. Thus, for example, if the cellphone 106 is closer to the personal identification device 102 than the detector 104, the personal identification device 102 can use less power by transmitting the response to the cellphone 106. By using less power to transmit the response, the personal identification device 102 can be implemented with a smaller capacity battery, as well as increasing the battery life of any battery. If the personal identification device 102 receives a beacon message from multiple devices, such as the detector 104 and the cellphone 106, as well as any others, the personal identification device 102 can transmit a reply to the nearest device.

At stage B, the detector 104 receives the personal identification device 102 response and determines whether the personal identification device 102 is within a predetermined range. The detector 104 can determine the distance of the personal identification device 102 using various techniques. For example, in a first technique, a protocol can define the amount of power the personal identification device 102 uses to transmit the response, or the personal identification device 102 can indicate in the response the power level used to transmit the response. The detector 104 can calculate the distance between the detector 104 and the personal identification device 102 based on a measured signal strength and the power used to transmit the response. However, a personal identification device 102 that uses more power than expected by the detector 104, can trick the detector 104 into determining that the personal identification device 102 is closer than it is. The detector 104 can instead calculate a "time of flight" of the message and/or the response to determine the distance between the detector 104 and the personal identification device 102.

The "time of flight" between the detector 104 and personal identification device 102 is the time taken for a message or response to travel between the detector 104 and personal identification device 102. The time of flight can be determined in multiple ways. For example, the detector 104 and personal identification device 102 can synchronize clocks and utilize message timestamps to determine the time of flight. In some embodiments, the detector 104 can determine the time of flight by noting the difference between a time of departure (TOD) of the message and a time of arrival (TOA) of the response to the message between the detector 104 and the personal identification device 102. The difference in time between the TOD and TOA less a Short Interframe Space (SIFS) time can be used to determine the distance between the detector 104 and the personal identification device 102. Because the signals used to communicate travel at a constant rate and the detector 104 does not rely on information from the personal identification device 102, the personal identification device 102 cannot appear to be closer than it actually is. Thus, calculating the time of flight can reduce the probability of a malicious device spoofing the personal identification device 102, thereby increasing security.

The predetermined range can be configured based on several factors. For example, if a successful authentication of the personal identification device 102 unlocks a door, the predetermined range can be configured to be within a few feet of the door, thus reducing the chances of a user inadvertently unlocking the door. However, if the personal identification device 102 is used to identify when a particular person walks into a building, the predetermined range can be configured to be a greater distance.

At stage C, the detector 104 transmits the personal identification device 102 identification values received in the response at stage A to the computing system 108 for authentication. The computing system 108 can include a database of personal identification devices, each identified by a unique number or other types of representations, such as a serial number. The personal identification device 102 unencrypted identification value can be the unique number that identifies the particular personal identification device 102 in the computing system 108 database. The personal identification device 102 encrypted identification value can be a cryptographic "proof" of the personal identification device's 102 identity. For example, public key cryptography can provide a mechanism to authenticate the personal identification device 102. The detector 104 can include a random value in the beacon message. The personal identification device 102 encrypts the random value using a private key stored only on the personal identification device 102. The encrypted random value becomes the encrypted identification value in the personal identification device 102 response, which is subsequently transmitted to the computing system 108. The computing system 108 uses a public key associated with the personal identification device 102 to decrypt the encrypted identification value. The computing system 108 can then compare the decrypted identification value to the random value from the beacon message (provided by the detector 104). If the values match, the personal identification device 102 is authenticated.

The actual implementation of the authentication can vary. For example, the computing system 108 can be implemented to provide the public key associated with the personal identification device 102 to the detector 104, which can decrypt the encryption value from personal identification device 102. The public key associated with the personal identification device 102 can be exchanged with the computing system 108 prior to use, such as during configuration of the personal identification device 102. The public key associated with the personal identification device 102 can also be stored in a database of public keys accessible to the computing system 108. Additionally, other types of cryptographic techniques, such as private key exchanges, can be utilized.

At stage D, the computing system 108 transmits a response to the detector 104. If the computing system 108 authenticated the personal identification device 102, the computing system 108 response includes whether the authentication was successful. If the detector 104 performs the authentication, the computing system 108 response can include any data for the detector 104 for the authentication, such as a public key associated with the personal identification device 102. Additionally, the response can include information about additional personal devices, such as the cellphone 106, that are associated with the personal identification device 102. As described below, the additional personal devices can be used to further authenticate the user, thus increasing security.

At stage E, the detector 104 communicates with the cellphone 106 to provide further authentication that the actual user is the legitimate user associated with the personal identification device 102. Upon receiving a computing system 108 response indicating that the personal identification device 102 was authenticated or performing the authentication based on the computing system 108 response, the detector 104 has authenticated the personal identification device 102. However, prior to communicating with any additional personal devices, the authentication is based solely on the personal identification device 102. Thus, mere possession of the personal identification device 102 can allow impersonation of the legitimate user associated with the personal identification device 102. For some scenarios, this level of security is sufficient. For example, if no further authentication is performed, the level of security is functionally similar to that of an RF keycard. However in other scenarios, additional authentication can be used.

One technique that can be used to increase the level of security is by associating additional personal devices with the personal identification device 102. For example, when configuring the personal identification device 102, the user can associate their cellphone 106 with the personal identification device 102. When the computing system 108 responds to an authentication request from the detector 104, as described at stage D, the computing system 108 can provide a list of associated personal devices, including the cellphone 106. The detector 104 can then attempt to establish communication with the cellphone 106. The authentication performed using the cellphone 106 can vary between implementations. For example, the cellphone 106 can have a public/private key pair similar to the personal identification device 102, or the detector 104 can rely solely on the cellphone 106 responding with proper identification. Additionally, more complex interactions are possible. For example, the personal identification device 102 and the cellphone 106 can be previously paired, allowing secure communication between the personal identification device 102 and the cellphone 106. The detector 104, after authenticating the personal identification device 102, can then indicate to the personal identification device 102 that additional authentication is to be used. The personal identification device 102 can then securely communicate with the cellphone 106 to direct the cellphone 106 to send a message to the detector 104. The detector 104 can also determine the distance between the detector 104 and the cellphone 106, as described above at stage B in relation to the personal identification device 102. Additionally, the personal identification device 102 can determine the distance between it and the cellphone 106, or vice versa, thus allowing a range restriction that ensures the personal identification device 102 and the cellphone 106 are located proximate to each other possessed by the user.

Thus, for example, assume a malicious user uses a cloned personal identification device 102 of a legitimate user to gain access to a building. Under normal operation, the detector 104 detects the personal identification device 102 and communicates with the cellphone 106 to further authenticate the identity of the legitimate user, as described above. If the legitimate user was in the building and the detector 104 could communicate with the cellphone 106, the malicious user could use the cloned personal identification device to gain entrance to the building. However, if the distance between the cellphone 106 and the cloned personal identification device is determined, the malicious user would not be able to gain access unless the malicious user was also near enough to the cellphone 106. If the range restriction between the personal identification device 102 and cellphone 106 was only a few feet, the malicious user would have to be within a few feet of the legitimate user and/or the cellphone 106 to utilize the cloned personal identification device, thus reducing the effectiveness of the cloned personal identification device.

By authenticating two personal devices (in this example, the personal identification device 102 and the cellphone 106), the detector 104 increases the probability that the user is the legitimate user associated with the personal identification device 102, thus increasing the level of security. The probability that the user is the legitimate user is increased because an imposter needs not only the personal identification device 102 but also the cellphone 106. A stolen or cloned personal identification device 102 cannot alone be used to gain access on behalf of the legitimate user. Authentication of multiple personal devices is not limited to just two personal devices. Additionally, because the detector 104 receives a list of personal devices associated with the personal identification device 102, the detector 104 can attempt to authenticate a third personal device (as indicated on the list) if the detector 104 fails to communicate with the cellphone 106. However, authentication of multiple personal devices is not true multi-factor authentication, because the personal devices are all items associated with the particular person. True multi-factor authentication can, however, be implemented, as described below.

At stage F, the user enters a password into a password entry device 112. The password associated with the personal identification device 102 can be configured by the legitimate user similar to configuring additional personal devices. The password (or a hash of the password) can be provided to the detector 104 by the computing system 108 in addition to the list of associated personal devices. The detector 104 validates the entered password by comparing the entered password to the password stored on the computing system 108.

Biometric data can be used as well, either in place of the password, or in addition to the password. When used in addition to the password, biometric data allows for three factor authentication. In some implementations, if one of the additional personal devices associated with the personal identification device 102, such as the cellphone 106, includes a data input mechanism, such as a keyboard, the associated personal device can act as the password entry device 112. Similarly, in some implementations, the personal identification device 102 is the password entry device 112.

The detector 104 can also use a password or biometric data as a fallback authentication technique if the authentication of the additional personal device fails. For example, the battery on the cellphone 106 may lose its charge causing the personal device to fail and preventing access by the legitimate user. If the detector 104 is configured to authenticate a personal identification device 102 using more than one personal device (e.g., more than the cellphone 106), the detector 104 can provide the option of entering a password on the password entry device 112 as a backup option.

The general set of operations depicted in FIG. 1 can be adapted to many specific implementations. For example, the detector 104 can be implemented within a computing system or connected to a computing system, such as the computing system 108 or one not depicted in FIG. 1, as a peripheral. The personal identification device 102 can then be utilized to increase security around everyday transactions while minimizing the burden on the user. For example, when navigating to a secure website, a web browser can use the detector 104 to determine whether a personal identification device 102 is within a predetermined distance from the computer. The detector 104 can authenticate the user and pass the user's information to the browser and, subsequently, the secure website. The secure website can automatically log the user in without the user entering in a username and password. Integration with an online service, such as described with the computing system 108 above, allows additional features to be implemented. For example, authentication tokens implemented as "rolling codes" can be used to increase security, either with automatic login functionality as described above or as additional security in addition to a standard username/password authentication technique, as discussed below. However, the personal identification device 102 decreases the burden on the user by communicating any authentication tokens to the website without additional interaction by the user.

A "rolling code" is a randomly changing passcode, or authentication token, that can be generated on different devices. To implement a "rolling code", authentication tokens can be generated at regular intervals determined by specified time periods, input counts, or challenge code entries. The authentication tokens are generated using a technique known to the computing system 108, allowing the computing system 108 to generate the same authentication token. By using the same technique and same input parameters (e.g., seed values and number of intervals), the personal identification device 102 and the computing system 108 can generate the same random authentication token. The next authentication token, however, cannot be determined based on the previous authentication tokens without knowledge of the input parameters, making it difficult for a malicious user to "spoof" the personal identification device 102. When the computing system 108 receives an authentication token from the personal identification device 102, the computing system 108 compares it with the authentication token generated on the computing system 108. If the authentication tokens match and any other authentication prerequisites are satisfied, the computing system 108 authenticates the personal identification device 102.

Similar scenarios arise when it is advantageous to have a minimal user interface. For example, the detector 104 can be implemented at a point-of-sale system to provide for contactless payment, single factor or two factor identification authentication, all without removing the personal identification device 102 from a pocket or purse. The level of security provided is either the same as currently available or greater, with less burden on the user. For example, using two factor authentication provides a faster transaction than current payment methods. After a cashier finishes scanning all of the user's items, the detector 104 detects the user's personal identification device 102. The detector 104 authenticates the personal identification device 102 as described above and employs the rolling code functionality completely transparent to the user. The user is prompted for a personal identification number (PIN), similar to current debit card transactions. However, the user does not remove and swipe any card, reducing the risk that a debit/credit card number will be stolen, while utilizing randomly changing passcodes, thus preventing a fake debit/credit card from being used. Similarly, the personal identification device 102 can be used to authenticate a user and allow access to restricted areas, while also tracking their access. However, much more dynamic implementations are possible that combine many of the various implementations discussed above.

For example, a user with an account established with his/her favorite hotel chain is planning a business trip. To reserve a room, the user navigates to the hotel's website, which uses the detector 104 connected to his/her computer to automatically log the user into the website. The user enters his/her trip information, and books a room. When the user arrives at the hotel, another detector detects his/her personal identification device 102. The user's information is automatically loaded onto a computer at the hotel front desk, allowing the staff to have the user checked-in by the time he/she reaches the front desk. The staff provides the room number, and the user heads straight for the room. Upon walking up to the hotel room door, yet another detector detects the user's personal identification device 102 and unlocks the hotel room door. Later, the user heads to the vending machine to purchase a snack and enters a PIN number to make the purchase. Similarly, when time to return home, the user walks up to a kiosk in the hotel lobby, enters his/her PIN number, and pays for the room. The entire process is made seamless, with equal or better security at each step than the process would be without a personal identification device 102, and additional conveniences along the way.

The service provided by the computing system 108 allows "preauthorization," or establishment of a relationship between the personal identification device 102 and the entity seeking to authenticate the personal identification device 102. For example, as described above, a user can link their account with their personal identification device 102. When the personal identification device 102 is authenticated appropriately, the authenticating identity (such as the hotel company) can then utilize the computing system 108 to provide information about the user, such as purchase history and preferences.

Furthermore, a virtual identity provided by the personal identification device 102 and the ability to associate permissions with the virtual identity can allow for seamless transitions between locations while allowing each location to be "aware" of the user. For example, detectors (such as the detector 104) located throughout an office building can determine the location of a user based on detecting his/her personal identification device 102. When the user enters a particular conference room, for example, the detector 104 can trigger all conference room devices to load permissions associated with the user. Thus, if the user has permission to use a phone in the conference room but not use a computer, the phone is automatically enabled while the computer is automatically disabled. Further, the user can have a single phone number, and a call to the user's phone number can be routed to the phone nearest the user based on a detector 104 authenticating the user's personal identification device 102. Additionally, data from the user's computer can be synchronized using a cloud-based service, such as that provided by the computing system 108. Thus, if the user was permitted to use the computer in the conference room, his/her data would automatically be available on the conference room computer upon detection of the personal identification device 102.

The personal identification device 102 can be implemented in many different forms. For example, the personal identification device 102 can be implemented as a keychain attachment, commonly referred to as a key fob. The personal identification device 102 can also be implemented in other form factors, such as being similar to a credit card, embedded in a watch or integrated into another electronic device.

While the examples described herein refer to the detector 104 receiving data from the computing system 108 in response to a query, the data from the computing system 108 can be "pushed" to the detector 104. For example, instead of querying the computing system 108 to determine whether the user associated with the personal identification device 102 is scheduled to use the conference room associated with the detector 104, the computing system 108 can send the data representing the conference room schedule when it changes or at regular intervals. The detector 104 can store the data for use, potentially decreasing response time when the personal identification device 102 is detected.

Figure 2:
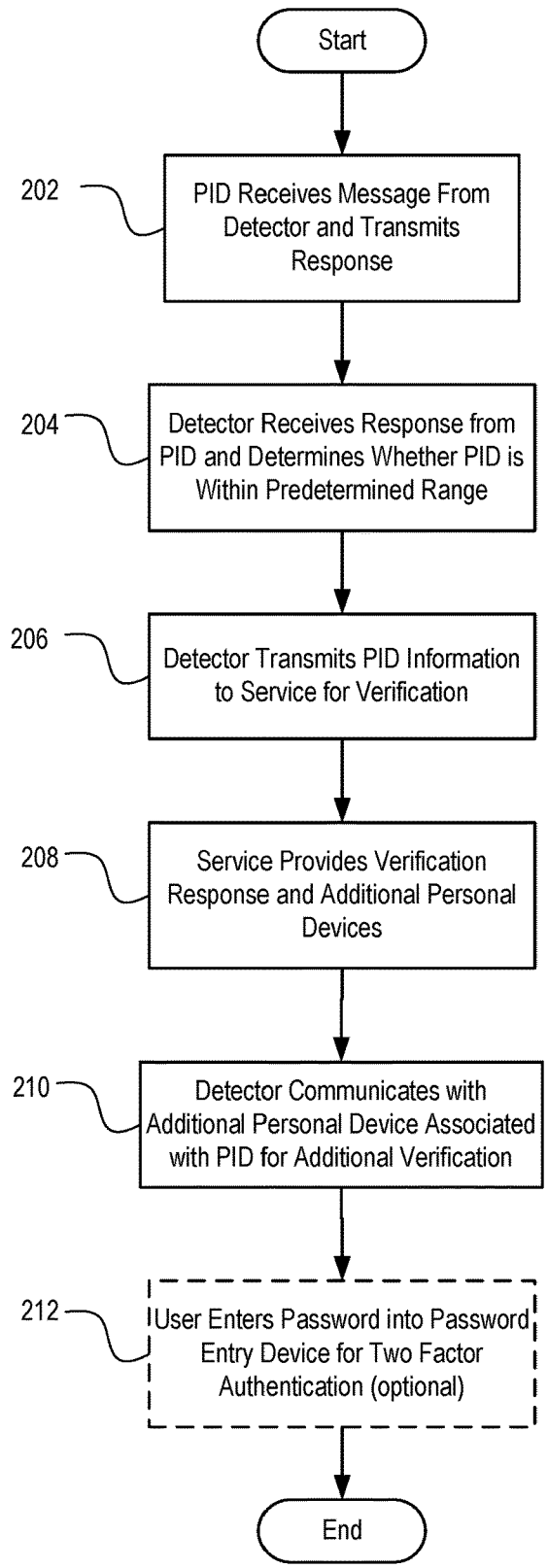
FIG. 2 depicts a flowchart of example operations for utilizing a system that implements a personal identification device and multi-device authentication.

FIG. 2 depicts a flowchart of example operations for utilizing a system that implements a personal identification device and multi-device authentication. Beginning at block 202, a personal identification device receives a beacon message from a detector and transmits a response. The personal identification device can be implemented to maintain a low power state until receiving a beacon message from the detector. The beacon message indicates that the detector is actively searching for nearby personal identification devices. In response to the beacon message, the personal identification device transmits a response indicating that the personal identification device has received the beacon message and is available for authentication. Additional metadata can be included in both the beacon message and the response, such as protocol information that allows communicating devices to determine compatibility levels and supported features. Additionally, the response contains data used to identify and authenticate the personal identification device. After transmitting the response, control then flows to block 204.

At block 204, the detector receives the response from the personal identification device and determines whether the personal identification device is within a predetermined range. Determining the range (distance) between the detector and the personal identification device allows the detector to disregard personal identification devices that are not close enough to the detector to trigger an associated action. For example, in an office building, a door may have a locking mechanism connected to a detector. When the detector authenticates a personal identification device that is associated with a user that has permission to unlock the door, the detector triggers the locking mechanism to unlock the door. However, many people may walk past the door but not intend to unlock it. Thus, the detector can be configured to have a predefined range such that only people who are within a particular distance trigger the unlocking mechanism. The predetermined ranges can be defined differently for different implementations. For example, one implementation may restrict the power level output of the personal identification device so that no communications occur with detectors over a certain distance away. The detector can determine the distance by using either the signal strength of the response from the personal identification device or by calculating the time of flight, as described above. After determining whether the personal identification device is within the predetermined range, control then flows to block 206.

At block 206, the detector transmits the identifying values received from the personal identification device to an identification service for authentication. The identifying values include a unique number identifying the particular personal identification device, as well as any additional data the identification service uses to authenticate the personal identification device. As described above, this may include an encrypted value that is decrypted and compared to the original value by either the identification service or the detector. After transmitting the identifying values to the identification service, control then flows to block 208.

At block 208, the detector receives authentication of the personal identification device identifying values and data about any additional personal devices associated with the personal identification device from the identification service. A successful authentication of the identifying values indicates that the personal identification device is authenticated. In other words, when the personal identification device transmits a unique number identifying it, the personal identification device is "claiming" that the personal identification device is the particular personal identification device associated with that unique number. The cryptographic authentication, as described above, provides very strong verification that the personal identification device is, in fact, the personal identification device associated with the unique identifying number. After receiving the authentication of the personal identification device and data about any additional personal devices associated with the personal identification device, control then flows to block 210.

At block 210, the detector communicates, or attempts to communicate with an additional personal device associated with the personal identification device. The detector uses the data provided by the identification service about any additional personal devices associated with the personal identification device to add additional security to the authentication. The detector can prevent false authentication from someone pretending to be the user by communicating with the additional personal device. After the detector communicates with the additional personal device, control then flows to block 212.

At block 212, the user optionally enters a password into a password entry device, thus providing two factor authentication. The use of an authentication method beyond utilizing cryptographic techniques to authenticate the personal identification device and communicating with another personal device associated with the user provides even greater security when needed. Additionally, the two factor authentication can function as a fallback option should communication with the additional personal device at block 210 fail.

Furthermore, biometric and other authentication methods can be used in place of a password, or used in addition to a password to provide additional levels of security. Authentication using the additional authentication method(s) is performed as described above. After authenticating using the additional authentication method(s), the process ends.

An important aspect to the operation of the personal identification device is ensuring adequate battery life. Thus, the personal identification device can utilize techniques to reduce power consumption. For example, the personal identification device can be implemented to communicate in response to another personal device communicating with it. While many wireless devices regularly transmit messages similar to the beacon message described above, the personal identification device can be implemented to not regularly transmit a beacon message, but only monitor received messages for transmitted beacon messages.

Additionally, a personal identification device can be implemented to offload processor-intensive work to more powerful devices, if such devices are available. For example, encryption and decryption can use significant computing power, even with hardware designed specifically for the particular purpose. The use of significant amounts of computing power can significantly reduce the battery life of the personal identification device. Further, low available power, such as when a battery becomes discharged, can reduce the distance that data from the personal identification device can be transmitted. However, the personal identification device can be paired with other personal devices, as described above. A smartphone, for example, can have a larger battery and hardware that is better suited for complex calculations (such as those employed in cryptographic applications) than the personal identification device, and can be used to relay data when the personal identification device lacks sufficient power. Additionally, the personal identification device can be paired with many other devices, such as tablet computers and personal computers, which can have more computing power than a smartphone. If the personal identification device is paired with a device having greater computing power, a larger battery or a continuous power source, then the personal identification device can delegate work to the paired device.

Figure 3:
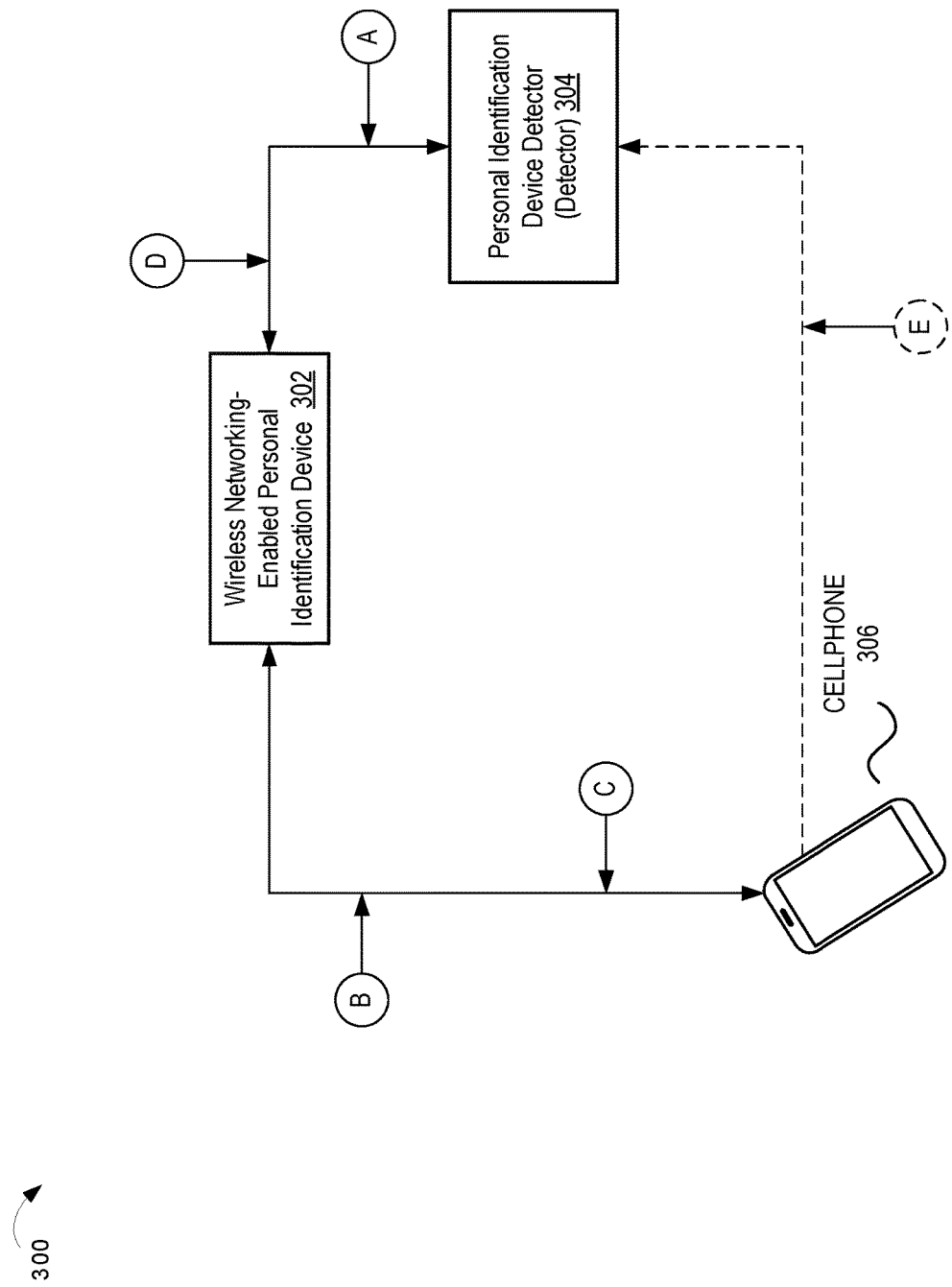
FIG. 3 is an example diagram depicting the interactions of a system that utilizes a personal identification device that offloads operations to another device.

FIG. 3 is an example diagram depicting the interactions of a system that utilizes a personal identification device that offloads operations to another device. FIG. 3 depicts a set of authentication-related components 300, including a personal identification device 302, a detector 304, and a cellphone 306. The communications between the personal identification device 302, the detector 304, and the cellphone 306 can be wireless communications.

At stage A, the personal identification device 302 receives a beacon message from the detector 304. The beacon message can be transmitted as described in stage A of FIG. 1. The beacon message can also contain the same or similar information as described above, including whether the personal identification device 302 should always respond to a beacon message from the detector 304.

At stage B, the personal identification device 302 delegates one or more operations to the cellphone 306. As described above, there are a variety of possible implementations for authenticating the personal identification device 302. Some implementations can include computationally expensive operations, such as encrypting or decrypting data. In order to preserve battery life, or decrease power consumption generally, the personal identification device 302 delegates one or more operations, such as computationally expensive operations, to the cellphone 306. The cellphone 306 or other devices that may be available for delegation of operations may include more powerful hardware, larger batteries, or be connected to continuous power sources, such as a local power grid. Thus, the cellphone 306 and other available devices may be better suited for performing the operations than the personal identification device 302.

Further, other operations can be delegated to the cellphone 306, not just computationally expensive operations. The specific operations that are available to be delegated can vary depending on implementation. For example, the personal identification device 302 hardware (including power source) and amount of power used to transmit the data used for the operation to the cellphone 306 can determine which operations are delegated. In other words, in some implementations, the power used to transmit data might be greater than the power used to perform the particular operation, thus making it more efficient to perform the operation on the personal identification device 302. In some implementations, the opposite might be true, thus making it more efficient to delegate the operation to the cellphone 306. Various other factors, such as the amount of power available to the personal identification device 302 can be taken into account as well. Thus, if the personal identification device 302 only has sufficient power to transmit data a certain distance, the personal identification device 302 can delegate the transmission of data to a device that can transmit the data farther.

The data transmitted from the personal identification device 302 to the cellphone 306 indicating the delegation of the operations can vary between implementations. For example, the transmitted data can include an indication of the operation to perform, input data for the operation, and an indication of where the result of the delegated operation should be transmitted. In some implementations, the input data may already reside on the cellphone 306. For example, the personal identification device 302 can include "rolling code" functionality as described above. The cellphone 306 may also implement the same rolling code functionality and be synchronized with the personal identification device 302 such that both devices produce the same code at a given time. Thus, the personal identification device 302 merely needs to indicate to the cellphone 306 that the data resulting from the delegated operations is to be used by/for the personal identification device 302. Responsive to a request from the personal identification device 302, the cellphone 306 encrypts the data and transmits it to the personal identification device 302 as described below.

At stage C, the cellphone 306 performs the delegated operations and transmits the results of the delegated operation back to the personal identification device 302. The cellphone 306 can be implemented to include the functionality to perform the delegated operations as a standard feature, similar to implementing a particular networking protocol. In some implementations, the cellphone 306 implements the functionality to perform the delegated operations by way of an additional software application that is installed onto the cellphone 306.

When the cellphone 306 receives the data facilitating the delegation of the operations (delegation data) from the personal identification device 302, the cellphone 306 analyzes the delegation data to determine what operations are to be performed. For example, the delegation data may indicate that a particular value should be encrypted using a particular encryption scheme. The cellphone 306 can then perform the encryption as requested by the personal identification device 302. After performing the operation, the cellphone 306 transmits the results of the operations back to the personal identification device 302.

At stage D, the personal identification device 302 receives the results of the delegated operations from the cellphone 306. The personal identification device 302 generates a response to the beacon message received from the detector 304 based on, or including, the data received from the cellphone 306. The personal identification device 302 transmits the response to the detector 304 as described above.

Optionally, at stage E, the cellphone 306 transmits the results from the delegated operations to the detector 304 instead of transmitting the results to the personal identification device 302. As described above, the personal identification device 302 can indicate to the cellphone 306 where the results should be transmitted to. For example, the personal identification device 302 can indicate a particular identifier associated with the detector 304, protocols the detector 304 is compatible with, etc. After performing the delegated operations, the cellphone can transmit the results directly to the detector 304, thus eliminating stages C and D. This can further improve the battery life of the personal identification device 302. In other words, some implementations can provide for the ability for the personal identification device 302 to delegate the actual transmission of the beacon message response to the cellphone 306. For example, if the distance the personal identification device 302 can transmit data is limited by low available battery power, the personal identification device 302 can delegate the transmission of data to the cellphone 306. Thus, the cellphone 306 can act as a relay between the personal identification device 302 and the detector 304.

Figure 4:
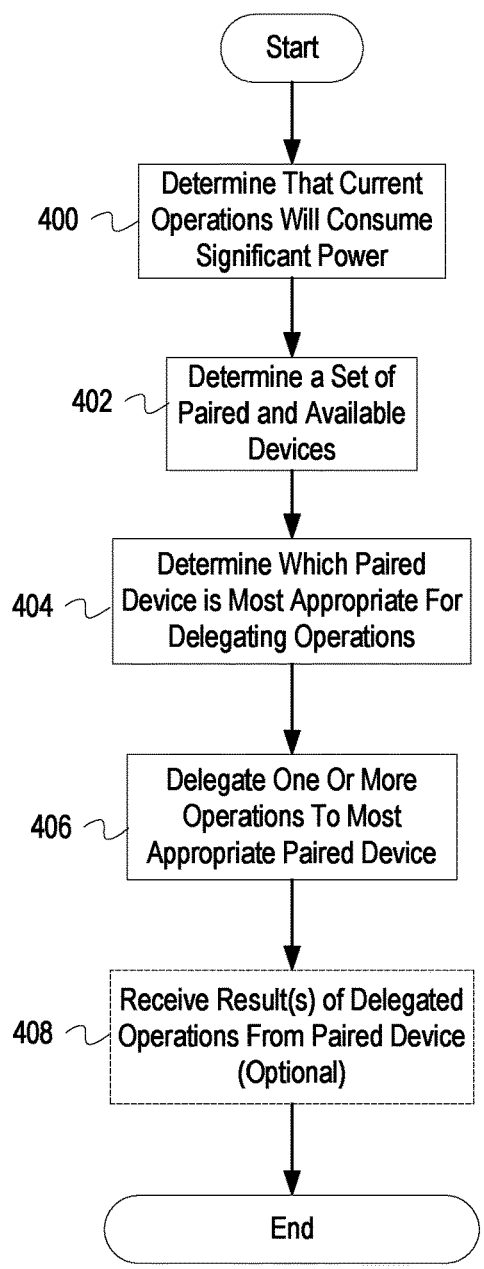
FIG. 4 depicts a flowchart of example operations for delegating operations from a personal identification device to another device.

FIG. 4 depicts a flowchart of example operations for delegating operations from a personal identification device to another device. Beginning at block 400, the personal identification device determines that the current operations will consume significant power (e.g., an amount of power beyond a threshold). The personal identification device can be designed to have limited functionality, such as reduced computational capability, when compared with a general purpose computing system. Thus, it can be known in advance that a certain subset of operations the personal identification device performs consume particularly significant amounts of power. For example, certain cryptographic functionality can consume a high amount of processing power, draining power from the battery more than other general operations. Thus, the personal identification device can determine when specific operations consume power beyond a threshold. The personal identification device can also be implemented to determine which operations consume the relatively large amounts of power dynamically by tracking and recording various statistics related to the battery, such as voltage levels. Furthermore, the personal identification device can be implemented to consider other delegable operations as candidates for delegation, not just operations that consume large amounts of power. After determining that the current operations will consume significant power, control then flows to block 402.

At block 402, the personal identification device determines which devices are currently paired with the personal identification device and which of the paired devices are available. A paired device is a device that has software and/or hardware that allows interoperability with the personal identification device and is configured to communicate with the personal identification device. Although the paired device can be any device that communicates with the personal identification device, the delegations of some operations may include the transfer of sensitive data, such as the personal identification device's private key. Thus, a paired device can be a device that has established a "trusted" connection with the personal identification device, in which communications between the personal identification device and paired device are private. However, the personal identification device can be implemented to pair with both trusted and untrusted devices and not delegate operations that include transferring sensitive data when paired with untrusted devices. Additionally, the personal identification device may be paired with devices that are currently unavailable by virtue of being turned off or being out of range. Thus, the personal identification device determines which of the paired devices are currently available. After determining which devices are currently paired and available, control then flows to block 404.

At block 404, the personal identification device determines which paired device is most appropriate for receiving delegated operations. The personal identification device can determine which paired device is the most appropriate based on a number of factors. For example, if two paired devices are available, one being battery powered and the other having a connection to a continuous power source, the paired device with the continuous power source may be considered the most appropriate. The personal identification device can also consider the processing power of the paired devices. In other words, a laptop may be more appropriate to delegate the current operation to than a cellphone. A current operational state of the paired device can be factored into the determination of which paired device is most appropriate for receiving delegated operations as well. The personal identification device may determine that a paired device that is already low on battery life is less appropriate than one with full battery life. Data available to the personal identification device can vary between implementations. For example, some implementations can be defined to allow the exchange of large amounts of metadata between the personal identification device and paired devices, such that the personal identification device can compare the specifications of different paired devices in detail. On the other hand, some implementations can be defined to include the exchange of very little, or no, metadata. After determining which paired device is the most appropriate for receiving the delegated current operations, control then flows to block 406.

At block 406, the personal identification device delegates one or more operations to the most appropriate paired device. The delegation of the operations can vary between implementations. For example, software on the paired device may contain functions that replicate the operations that can be performed on the personal identification device. Thus, the personal identification device may send the data that serves as inputs to the functions, allowing the paired device to perform the work the personal identification device would otherwise be required to perform. Other implementations can include the personal identification device generating a set of program instructions dynamically that is executed by software on the paired device. After delegating one or more operations to the most appropriate paired device, control then flows to block 408.

At block 408, the personal identification device optionally receives the result(s) of the delegated operations. For example, if the delegated operations include the encryption of data, the results returned to the personal identification device would generally include the encrypted data. Some operations may not return any data. For example, the personal identification device may delegate the encryption and subsequent transmission of the encrypted data instead of delegating just the encryption, receiving the data from the paired device, then transmitting it from the personal identification device. After optionally receiving the results of the delegated operations, the process ends.

As example flowcharts, the flowcharts depicted above present operations in an example order from which embodiments can deviate (e.g., operations can be performed in a different order than illustrated and/or in parallel). For example, FIG. 2 depicts the detector sending a single beacon and receiving a single response from the personal identification device. However, multiple messages may be passed back and forth as defined by the particular implementation.

The term "connected" is used herein. The term "connected" can mean directly or indirectly coupled as well as communicatively or physically coupled. The term "connected" is not restricted to a specific type of connection unless explicitly stated. For example, when used to describe components that are connected in order to enable communication, they can be connected directly by one or more wires, connected directly using a wireless connection, connected through one or more intermediate components, connected through one or more networks that span any distance, etc. As long as the components can communicate with each other, they are "connected." Further, components that are "connected" can also be integrated into one another, thus both physically and communicatively connected.

While the examples described herein refer to a personal identification device that includes battery power, personal identification devices are not so limited. In some implementations, the personal identification device is powered by electromagnetic signals transmitted by another device, such as a detector. In some implementations, the personal identification device utilizes battery power for some operations, while using power generated by electromagnetic signals transmitted by another device for other operations.

Further, while the examples use a cellphone as an example of an additional personal device used for authentication, the additional personal device can be any type of device, including an additional personal identification device. In other words, each device used to authenticate a user can be termed a "personal identification device", wherein the detector communicates with a set of one or more personal identification devices to determine the authenticity of the user. The personal identification device that initiates the authentication is the primary personal identification device, any second personal identification device is the secondary personal identification device, any third personal identification device is the tertiary personal identification device, etc.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 5:
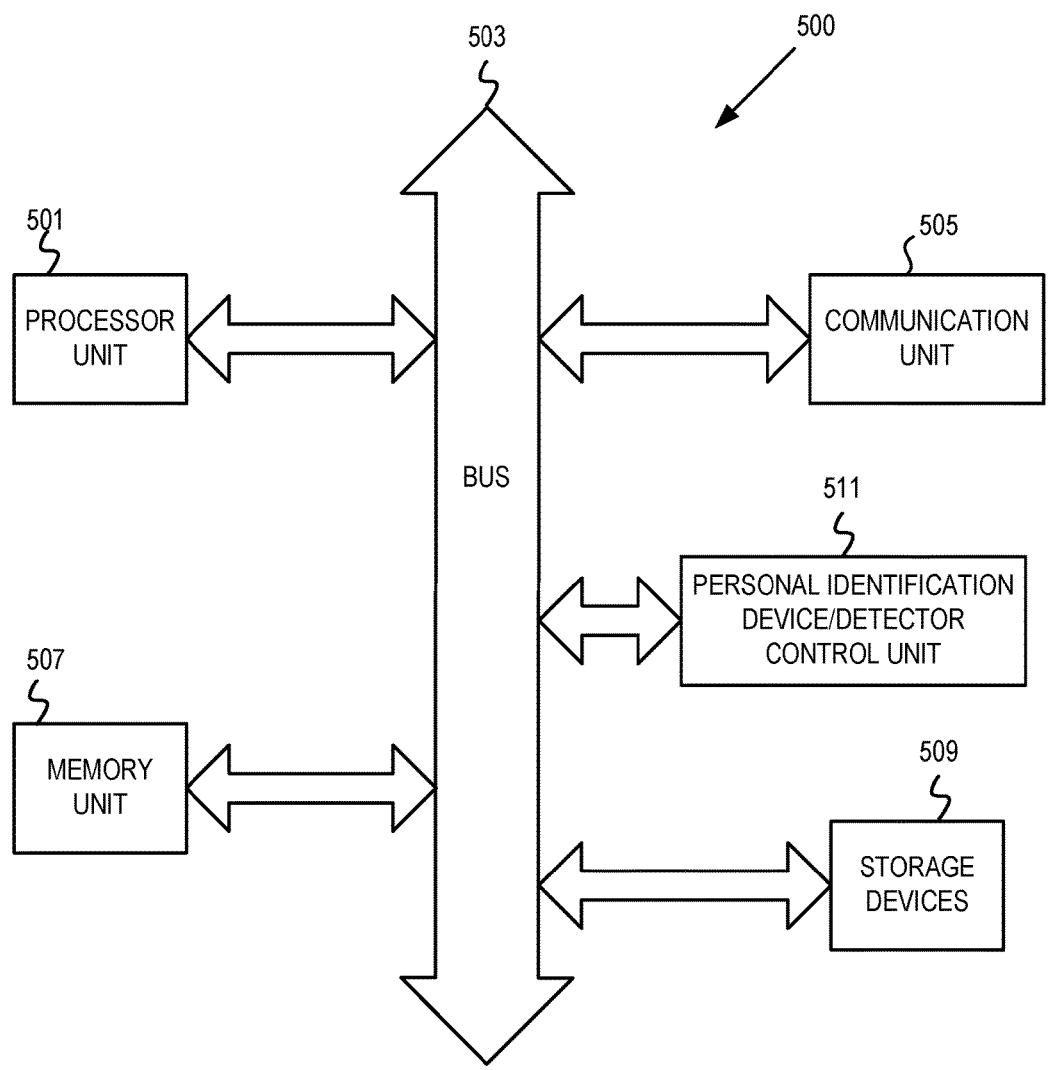
FIG. 5 depicts a block diagram of one embodiment of an electronic device.

FIG. 5 depicts a block diagram of one embodiment of an electronic device 500. In some embodiments, the electronic device 500 can be a laptop computer, a tablet computer, a netbook, a mobile phone, a smart appliance, a gaming console, a router, a desktop computer, or other suitable electronic device comprising wired and/or wireless communication capabilities. The electronic device 500 includes a processor unit 501 (possibly including multiple processors, multiple cores, multiple nodes, and/or implementing multi-threading, etc.). The electronic device 500 includes a memory unit 507. The memory unit 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable storage media. The electronic device 500 also includes a bus 503 (e.g., PCI, ISA, PCI-Express, HyperTransport®, Infini-Band®, NuBus, etc.), a communication unit 505 that can include a network interface (e.g., an ATM interface, an Ethernet interface, a Frame Relay interface, SONET interface, wireless interface, etc.), and a storage device(s) 509 (e.g., optical storage, magnetic storage, etc.). The electronic device 500 includes a personal identification device/detector control unit 511. In some embodiments, the personal identification device/detector control unit 511 embodies functionality to implement embodiments of a personal information device as described above. The personal identification device/detector control unit 511 may include one or more functionalities that facilitate the operations of a personal identification device. In some embodiments, the personal identification device/detector control unit 511 embodies functionality to implement embodiments of a personal identification device detector as described above. The personal identification device/detector control unit 511 may include one or more functionalities that facility the operation of a personal identification device detector. The electronic device 500 can also embody a personal identification service computing system or any other device described herein, using a control unit similar to the personal identification device/detector control unit 511. Any one of these functionalities may be partially (or entirely) implemented in hardware and/or on the processor unit 501. For example, the functionality may be implemented with an application specific integrated circuit, in logic implemented in the processor unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the communication unit 505 are coupled to the bus 503. Although illustrated as being coupled to the bus 503, the memory unit 507 may be coupled to the processor unit 501.

While the embodiments are described with reference to various implementations and exploitations, it will be understood that these embodiments are illustrative and that the scope of the inventive subject matter is not limited to them. In general, techniques for wireless devices as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for conserving power at a personal identification device, the method comprising:

determining, by the personal identification device, to perform an encryption operation;

determining the personal identification device will consume an amount of power greater than a power threshold to perform the encryption operation;

determining the personal identification device can wirelessly communicate with a first device that is capable of performing the encryption operation;

receiving, by the personal identification device, a beacon message from a second device;

delegating, by the personal identification device, the encryption operation to the first device based, at least in part, on determining the personal identification device will consume the amount of power that is greater than the power threshold to perform the encryption operation, the first device located proximate to the personal identification device within a range for wireless communications;

providing, by the personal identification device, authentication data to the first device for encrypting the authentication data;

receiving, by the personal identification device, encrypted authentication data from the first device after the first device performs the encryption operation; and responsive to receiving the beacon message and the encrypted authentication data, providing, by the personal identification device, the encrypted authentication data received from the first device to the second device for authentication of the personal identification device.

2. The method of claim 1, further comprising:
determining the personal identification device can communicate with a third device that is capable of performing the encryption operation;
determining that the first device is more appropriate to perform the encryption operation than the third device, wherein
delegating the encryption operation to the first device is in response to determining that the first device is more appropriate to perform the encryption operation than the third device.

3. The method of claim 2, wherein determining that the first device is more appropriate to perform the encryption operation than the third device is based on at least one member of the group consisting of a battery capacity of the first device, a remaining battery life of the first device, a processing power of the first device, a power source of the first device, and an operational state of the first device.

4. The method of claim 1, wherein delegating the encryption operation to the first device comprises providing data for the encryption operation to the first device, wherein the data comprises at least one member of the group consisting of an indication of the encryption operation to perform, the authentication data for the encryption operation, and an indication that results of the encryption operation are to be transmitted to one of the personal identification device or the second device.

5. The method of claim 1, wherein the first device is a cellphone, a tablet computer, or a laptop computer, and the personal identification device is a keychain device, an electronic credit card, or a watch.

6. A personal identification device comprising:
a memory; and
a processor coupled with the memory, the processor configured to:
determine to perform an encryption operation;
determine the personal identification device will consume an amount of power greater than a power threshold to perform the encryption operation;
determine the personal identification device can wirelessly communicate with a first device that is capable of performing the encryption operation;
receive a beacon message from a second device;
delegate the encryption operation to the first device based, at least in part, on a determination that the personal identification device will consume the amount of power that is greater than the power threshold to perform the encryption operation, the first device located proximate to the personal identification device within a range for wireless communications;
provide authentication data to the first device for encrypting the authentication data;
receive encrypted authentication data from the first device after the first device performs the encryption operation; and
responsive to receipt of the beacon message and the encrypted authentication data, provide the encrypted authentication data received from the first device to the second device for authentication of the personal identification device.

7. The personal identification device of claim 6, wherein the processor is further configured to:

determine the personal identification device can communicate with a third device that is capable of performing the encryption operation;
determine that the first device is more appropriate to perform the encryption operation than the third device; and
delegate the encryption operation to the first device in response to determining that the first device is more appropriate to perform the encryption operation than the third device.

8. The personal identification device of claim 7, wherein the processor is configured to determine that the first device is more appropriate to perform the encryption operation than the third device based on at least one member of the group consisting of a battery capacity of the first device, a remaining battery life of the first device, a processing power of the first device, a power source of the first device, and an operational state of the first device.

9. The personal identification device of claim 6, wherein the processor configured to delegate the encryption operation to the first device comprises the processor configured to provide data for the encryption operation to the first device, wherein the data comprises at least one member of the group consisting of an indication of the encryption operation to perform, the authentication data for the encryption operation, and an indication that results of the encryption operation are to be transmitted to one of the personal identification device or the second device.

10. The personal identification device of claim 6, wherein the first device is a cellphone, a tablet computer, or a laptop computer, and the personal identification device is a keychain device, an electronic credit card, or a watch.

11. A non-transitory machine-readable storage medium having instructions stored therein, which when executed by one or more processors of a personal identification device cause the personal identification device to: determine to perform an encryption operation;
determine the personal identification device will consume an amount of power greater than a power threshold to perform the encryption operation;
determine the personal identification device can wirelessly communicate with a first device that is capable of performing the encryption operation;
receive a beacon message from a second device;
delegate the encryption operation to the first device based, at least in part, on determining the personal identification device will consume the amount of power that is greater than the power threshold to perform the encryption operation, the first device located proximate to the personal identification device within a range for wireless communications;
provide authentication data to the first device for encrypting the authentication data;
receive encrypted authentication data from the first device after the first device performs the encryption operation; and
responsive to receipt of the beacon message and the encrypted authentication data, provide the encrypted authentication data received from the first device to the second device for authentication of the personal identification device.

12. The non-transitory machine-readable storage medium of claim 11, wherein the instructions, when executed by the one or more processors of the personal identification device, further cause the personal identification device to:

determine the personal identification device can communicate with a third device that is capable of performing the encryption operation;

determine that the first device is more appropriate to perform the encryption operation than the third device; and delegate the encryption operation to the first device in response to determining that the first device is more appropriate to perform the encryption operation than the third device.

* * * * *